United States Patent [19]

Newman

[11] Patent Number: 6,023,351
[45] Date of Patent: Feb. 8, 2000

[54] REGULARIZED PRINTER LUT WITH IMPROVED ACCURACY

[75] Inventor: Todd Newman, Palo Alto, Calif.

[73] Assignee: Canon Kabushiki Kaisha, Tokyo, Japan

[21] Appl. No.: 09/220,071

[22] Filed: Dec. 23, 1998

[51] Int. Cl.$^7$ .................................. H04N 1/46; G06F 3/08
[52] U.S. Cl. .......................... 358/524; 358/522; 358/523; 358/530
[58] Field of Search ..................................... 382/162, 167, 382/166, 168; 358/524, 522, 523, 530, 535

[56] References Cited

U.S. PATENT DOCUMENTS

| | | | |
|---|---|---|---|
| 4,992,861 | 2/1991 | D'Errico | 358/75 |
| 5,207,950 | 4/1993 | Kawashima | 395/200 |
| 5,579,031 | 11/1996 | Liang | 345/154 |
| 5,594,557 | 1/1997 | Rolleston et al. | 358/518 |
| 5,594,558 | 1/1997 | Usami | 358/518 |
| 5,652,831 | 7/1997 | Huang et al. | 395/131 |
| 5,724,442 | 3/1998 | Ogatsu | 382/167 |
| 5,764,387 | 6/1998 | Yamada | 350/525 |
| 5,781,206 | 7/1998 | Edge | 347/19 |
| 5,786,908 | 7/1998 | Liang | 358/518 |
| 5,881,211 | 3/1999 | Matsumura | 395/109 |
| 5,905,490 | 5/1999 | Shu | 345/199 |

OTHER PUBLICATIONS

Agar, A. Ufuk, et al., "A Minimax Method for Sequential Linear Interpolation of Nonlinear Color Transformations", The Fourth Color Imaging Conference: Color Science, Systems and Applications, pp. 1–5.

Bone, Don, "Adaptive color–printer modeling using regularized linear splines", SPIE, vol. 1909, pp. 104–115.

Hung, Po–Chieh, "Colorimetric Calibration in electronic imaging devices a look–up–table model and interpolations", Journal of Electronic Imaging, vol. 2(1), Jan. 1993, pp. 53–61.

Primary Examiner—Jerome Grant, II
Attorney, Agent, or Firm—Fitzpatrick, Cella, Harper & Scinto

[57] ABSTRACT

A fully regularized printer LUT with improved accuracy is generated by measurement of color patches at a first LUT interval and measurement of color patches for critical color regions at intermediate points between the first LUT interval. Thereafter, a fully regularized LUT is produced at a second LUT interval which is less than the first interval, by insertion of all measurement values into the regularized LUT and by insertion of interpolated values into the regularized LUT at grid points that were not actually measured. In a case where eccentric points have been measured, meaning points that are closely adjacent to the regularized LUT grid, actually-measured values are not entered into the LUT grid; rather interpolated values are entered, with interpolation being such that post-processing of the entries yields the measured value for the eccentric point.

28 Claims, 9 Drawing Sheets

LEGEND

— GRID LATTICE FOR WIDE INTERVAL LUT
------ GRID LATTICE ADDED TO MAKE UP CLOSE INTERVAL LUT
X EMPIRICALLY MEASURED VALUES AT WIDE INTERVAL
⊠ EMPIRICALLY MEASURED VALUES INTERMEDIATE THE WIDE INTERVAL
○ INTERPOLATED VALUES AT CLOSE INTERVAL

LEGEND

— GRID LATTICE FOR WIDE INTERVAL LUT
- - - - GRID LATTICE ADDED TO MAKE UP CLOSE INTERVAL LUT
X  EMPIRICALLY MEASURED VALUES AT WIDE INTERVAL
⊠  EMPIRICALLY MEASURED VALUES INTERMEDIATE THE WIDE INTERVAL
○  INTERPOLATED VALUES AT CLOSE INTERVAL
◎ⓧ⊠  POINTS WHOSE VALUES ARE MODIFIED BASED ON ECCENTRIC POINTS
+  ECCENTRIC POINTS

REGULARIZED PRINTER LUT WITH IMPROVED ACCURACY

BACKGROUND OF THE INVENTION

1. Field of the Invention

The present invention concerns generation of a color look-up table (LUT) by which colors in a first color space (such as RBG or CMYK or other device dependent color space) are converted to or from a second color space (such as CIELAB or other device independent color space). Specifically, the invention concerns generation of such a color look-up table at regularized grid intervals, without requiring an actual empirical color measurement at each grid point.

2. Description of the Related Art

Conventional color systems often employ look-up tables (LUTs) for conversion between color spaces. For example, it is conventional to employ a LUT so as to convert device independent colors to printer output colorant values for printout by a color printer.

Such LUTs are conventionally built by color measurement of sample outputs of the device for a reasonably sized sample of color patches in the device color space. Preferably, such color patches are uniformly spaced at regular intervals along the device color space. The reason that the samples are uniformly spaced at regular intervals across the device color space is that when accessing entries in the LUT, computer throughput and speed is increased greatly since color coordinates for desired colors can easily be mapped into the LUT. In contrast, non-uniformly spaced LUTs require a pre-processing step in order to map from a desired color to a grid point in the LUT, and it is this pre-processing step that greatly reduces speed and throughput when accessing the LUT.

On the other hand, certain regions of a device's color space are critical in the sense that good color reproduction is required (such as for flesh tones), or in the sense that large non-linearities occur even with small changes in device color coordinates. For such regions, it is desired to obtain more color patches by decreasing the interval between samples, so as to obtain greater color accuracy and fidelity in these critical regions. However, if a regularized LUT is desired, then in order to increase the sampling just in a few critical regions, it is also necessary to increase sampling throughout the entire colorant space. Such an increase is ordinarily time-consuming and inefficient, because of the need to make measurements at each new grid point. For example, to increase sampling from an 8×8×8×8=4,096 patch LUT, to a 9×9×9×9=6,561 color patches, an additional 2,465 color patches are required, with corresponding color measurements.

U.S. Pat. No. 5,594,557 to Rolleston proposes one approach for increasing color accuracy in certain critical regions. According to Rolleston's patent, in regions of local non-linearities, additional data points are provided to a look-up table based on empirically measured colors together with calculated colors that have not been measured. Two drawbacks remain in Rolleston's method. First, the resulting printer LUT is not regular in the sense that the interval between grid points is not fixed. Thus, access to entries in the LUT requires a pre-processing map between a color value and a corresponding address in the LUT, thereby slowing access. Second, the resulting LUT is not completely filled. Thus, a more complicated interpolation involving non-uniform interpolation is required in post-processing for colors not found identically on the LUT grid.

SUMMARY OF THE INVENTION

It is an object of the present invention to provide a fully regularized printer LUT with improved printer accuracy, in which the interval between entries in the LUT is fixed and is small enough to ensure accuracy and fidelity in critical regions for color reproduction, and in which the entries are mixed entries of empirically measured color values and values mathematically derived from adjacent empirical measurements through a weighted average.

Briefly, according to the invention, to generate a regularized color LUT with increased color accuracy in critical regions, empirical measurements are made at a large interval throughout the entire color space, and additional empirical measurements are made in the critical region. Thereafter, the LUT is regularized based on a grid defined by the interval between measurements in the critical regions, with values for the LUT at grid points not actually measured being obtained by interpolation (such as a weighted average) between actually-measured values.

In one representative example, measurements are made initially in a regularized LUT having an 8×8×8×8=4,096 grid points. Thereafter, measurements are made in critical regions at points exactly midpoint between grid points in the 8×8×8×8 LUT. Then, the LUT is re-regularized to a 16×16×16×16 grid point arrangement, with values at grid points that were not actually measured being inserted by interpolation between values in the original 8×8×8×8 LUT that were actually measured.

Because the LUT is fully regularized, it is possible to increase access speeds to the LUT, since addresses to entries in the LUT can be obtained easily from the input color coordinates. Moreover, since the LUT contains entries at each and every grid point therein, it is possible to obtain converted color output values quickly, ordinarily without any need for post-processing such as non-uniform interpolation.

Thus, according to a first aspect, the invention concerns generation of a regularized printer LUT with improved accuracy by measurement of color patches at a first interval, and by measurement of color patches for critical color regions at intermediate points between the first interval. Thereafter, a regularized LUT is produced at a second LUT interval which is smaller than the first interval, by insertion of all measured points into the regularized LUT and by insertion of interpolated values into the regularized LUT at grid points that were not actually measured.

More generalized aspects of the invention are particularly useful for measurement of "eccentric points", meaning points not located exactly midway between existing grid points. Accurate color reproduction of such eccentric points might be of particular concern in situations where those eccentric points represent a particular color in a logo, or represent particular colors in a standardized reproduction test. For such eccentric points, it is not ordinarily practical to decrease the interval between grid points in correspondence to the location of the eccentric points, and still maintain a fully regularized LUT, since such criteria might entail a fully regularized LUT of enormous size. In those instances, therefore, entries for grid points near the eccentric points of a fully regularized LUT are replaced by interpolated values, even when such grid points have an actually-measured value. The interpolated values for such grid points are calculated so as to yield a value at the eccentric point which is exactly the empirically measured value for such eccentric point.

Thus, according to this aspect of the invention, to generate a color look-up table by which color values in a first color space are converted to color values in a second color space, with the color look-up table being defined by regular grid points with a fixed grid interval therebetween, empirical measurements are obtained in the second color space for a first set of plural color values in the first color space, with the first set of plural color values being substantially all of the color values at grid points on a first grid interval. The first grid interval is larger than the fixed grid interval. Empirical measurements are obtained for a second set of plural color values in the first color space, the second set being color values at intermediate points between the grid points on the first grid interval and including eccentric points. Thereafter, the fixed grid interval is selected for the color look-up table, with the fixed grid interval being smaller that the first grid interval, and encompassing at least some of the grid points. Entries are thereafter calculated for the color look-up table at each and every grid point defined by the fixed grid interval, the entry for each grid point being calculated by a weighted average of empirical measurements from the first and second sets of color values that are adjacent each said grid point. The entry for any particular grid point is therefore equal to an interpolation of empirical measurements of adjacent grid points where the grid point does not coincide with an empirical measurement. If the grid point coincides with an empirical measurement, then the entry for a grid point is equal to the empirical measurement unless the grid point is adjacent an eccentric grid point. In that latter case, the entry for the grid point is a weighted average such that post-processing interpolation of the entries at the grid points yields the measured eccentric point.

Because even points lying exactly on the fully regularized LUT's grid are replaced with interpolated values in cases where such grid points are adjacent to eccentric points, color fidelity and accuracy of such eccentric points are preserved without requiring undue expansion of the LUT. That is, in a case where an eccentric point and an ordinary grid point were separated by only one intensity level, full application of the first aspect of the invention might have resulted in a regularized printer LUT having over 4 billion entries. Such results are largely avoided according to this second aspect of the invention, since even grid points containing actually measured values are replaced by interpolated values that result in accurate color reproduction and fidelity for eccentric points, even though such eccentric points are not represented by any grid point in the LUT.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
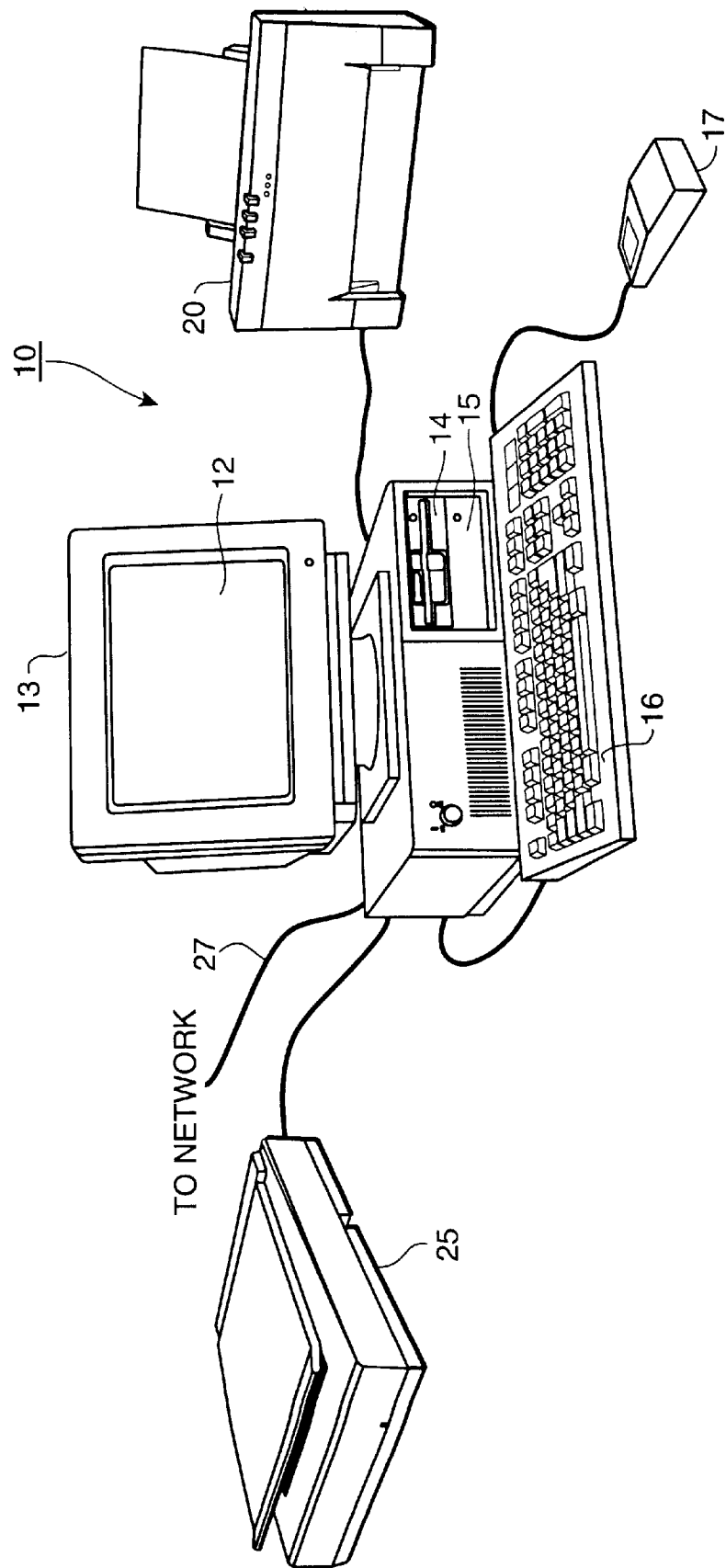
FIG. 1 is a view showing the outward appearance of representative computing equipment which generates a regularized printer LUT according to the invention.

FIG. 1 is a view showing the outward appearance of representative computing equipment which generates a regularized printer LUT in accordance with the invention. As shown in FIG. 1, computing equipment 10 is a personal computer ("PC") connected to a display monitor 13 having a display screen 12 on which computing equipment 10 displays images to the user. Computing equipment 10 is further provided with a floppy disk drive 14 with which removable disk media may be read or written, fixed disk drive 15 for storing data files and application program files, a keyboard 16 for permitting input of text data and manipulation of objects displayed on display screen 12, and a pointing device 17 such as a mouse or the like which also permits manipulation of objects displayed on display screen 12. A conventional color printer 20, such as a color laser beam printer or bubble jet printer, is also connected to computing equipment 10. It is one purpose of the invention to generate a regularized printer LUT for use in characterizing printer 20.

Also connected to computing equipment 10 is color scanner 25 for scanning samples of color patches from printer 20, or for scanning other samples of printed output from printer 20. The combination of color printer 20 and color scanner 25 is one example of how input means obtains empirical measurements of device-dependent data for generation of a regularized printer LUT according to the invention. Other examples include any manual or automated devices for measuring color samples from printer 20, such as a strip chart recorder or an X-Y calibration table, or conventional calorimeters (such as a Gretag). Moreover, it is not strictly necessary for printer 20 and scanner 25 actually to be connected to computing equipment 10. Rather, empirical measurements of device-dependent data for a target printer may be obtained by other devices and provided to computing equipment 10 such as over a network interface 27 or through exchange of removable disk media.

Figure 2:
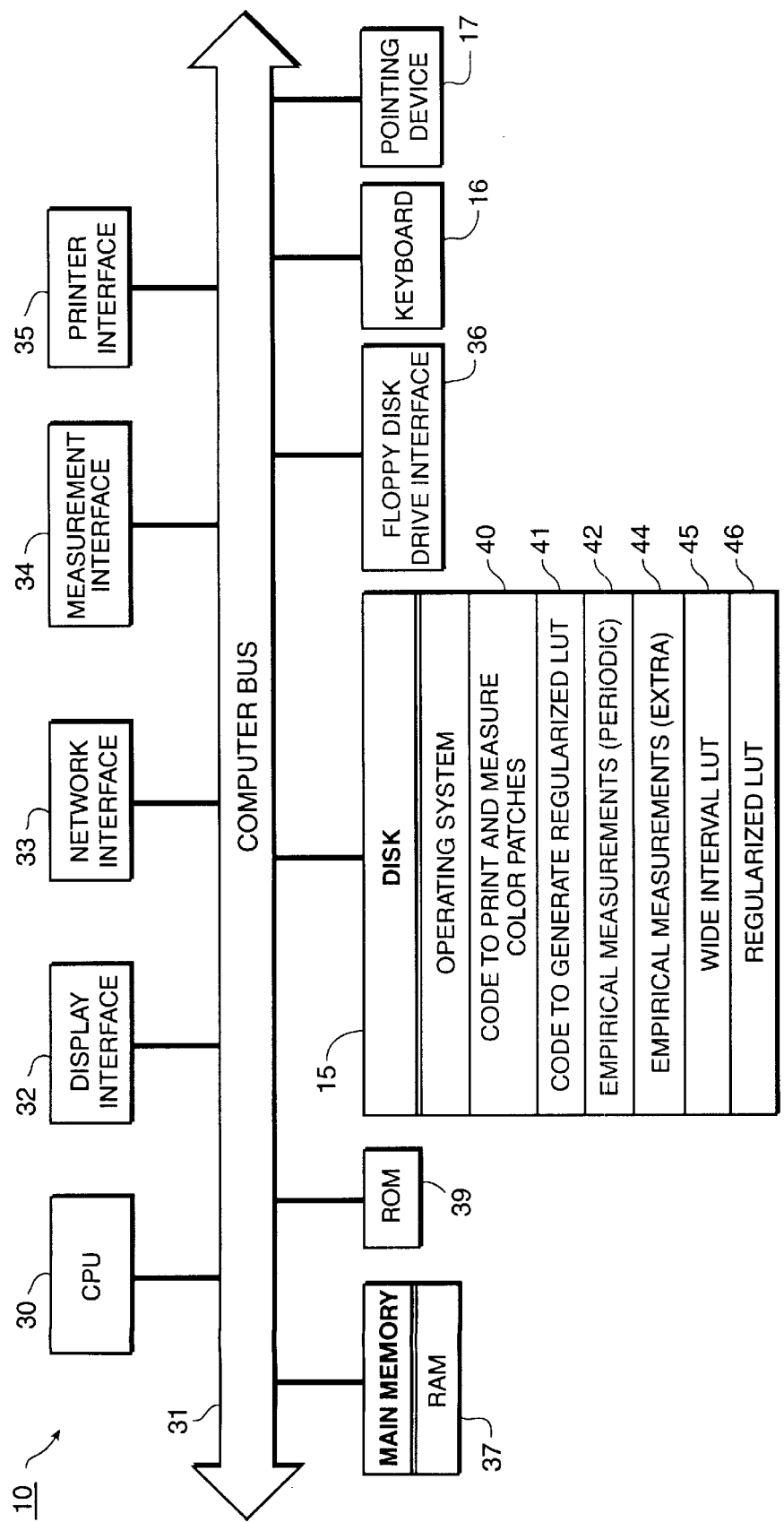
FIG. 2 is a detailed block diagram showing internal construction of the computing equipment of FIG. 1.

FIG. 2 is a detailed block diagram showing the internal construction of computing equipment 10. As shown in FIG. 2, computing equipment 10 includes a central processing unit ("CPU") 30, such as a programmable microprocessor, interfaced to a computer bus 31. Also interfaced to computer bus 31 is display interface 32 for interfacing to display monitor 13, network interface 33 for interface to network 27, measurement interface 34 for interface to scanner 25, printer interface 35 for interface to printer 20, and floppy disk interface 36 for interface to floppy disk 14. Main memory 37 such as random access memory ("RAM") interfaces to computer bus 31 so as to provide CPU 30 with access to memory storage. In particular, when executing stored program instruction sequences such as code stored on disk 15, CPU 30 loads such code from disk 15 (or other storage media such as media accessed via network 27 or floppy disk drive 14) into main memory 37 and executes those stored program instruction sequences out of main memory 37. Of course, disk swapping routines executed by the operating system might cause segments of memory to be swapped onto and off from disk 15.

ROM 39 is provided for storing invariant instruction sequences such as start-up instruction sequences or basic input/output operating system ("BIOS") sequences for operation of keyboard 16.

As shown in FIG. 2, fixed disk 15 stores program instruction sequences in the form of computer executable instruction sequences (or computer executable code). Thus, stored on disk 15 are an operating system together with various application programs such as graphics application programs, drawing application programs, desktop publishing application programs, and the like; together with various data files such as image data files, database files and the like. In particular, stored on disk 15 is code, executable by CPU 30, that causes printer 20 to print out color samples such as color patches, and causes scanner 25 to measure colorimetric values for such color patches and store them as empirical measurements (42 and 44). Also stored on disk 15 is code 41 to generate a regularized printer LUT according to the invention. In particular, code 41 generates a regularized printer LUT that is stored at 46, and which may be based on a wide-interval LUT 45 representative of the empirical measurements obtained by code 40.

Figure 3A:
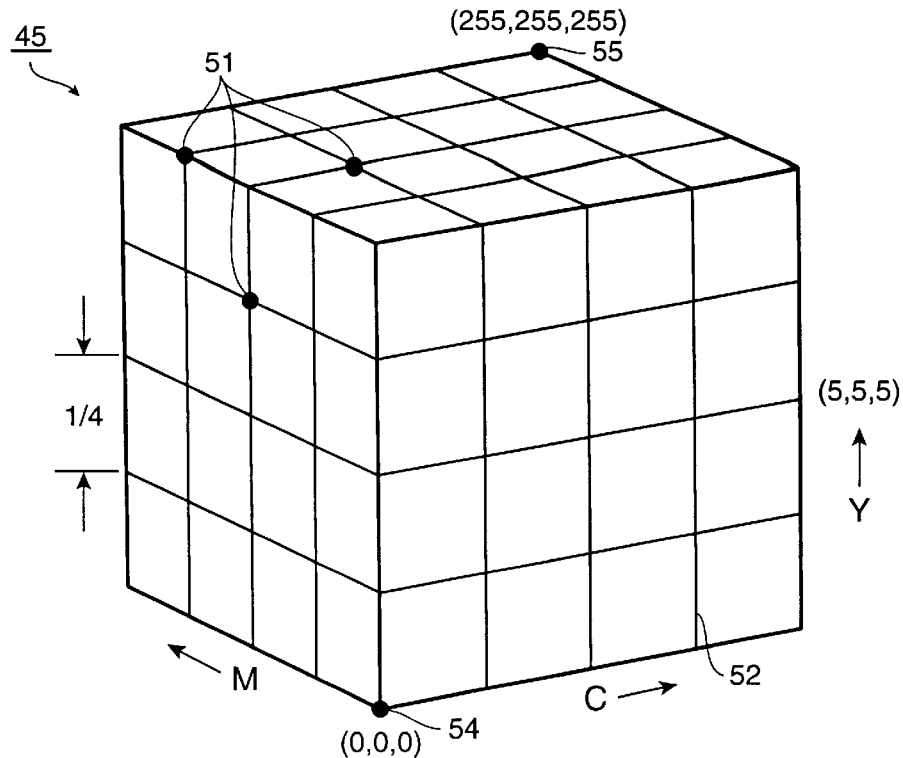
FIGS. 3A and 3B are diagrammatic illustrations of printer LUTs having wide and close intervals, respectively.

FIG. 3A is a representative view of a wide-interval printer LUT, such as LUT 45. As shown in FIG. 3A, LUT 45 is arranged as a three-dimensional lattice of grid points such as grid points 51 arranged regularly on a three-dimensional lattice 52. The lattice is a regular lattice arranged at a wide grid interval which, in the example of FIG. 3A is an interval of ¼ of the intensity range for each of cyan, magenta and yellow color components that make up the device-dependent color space of printer 20. Thus, LUT 45 is arranged as a 5×5×5 grid of points such as points 51, ranging from a minimum point 54 of C=M=Y=0 to a maximum point 55 of C=M=Y=255. At each grid point 51, an entry is stored for LUT 45, with the entry providing device independent color measurements for the corresponding device dependent color coordinates. A suitable device independent color measurement space is a perceptually uniform color space such as the CIELAB L*a*b* color space.

Figure 3B:
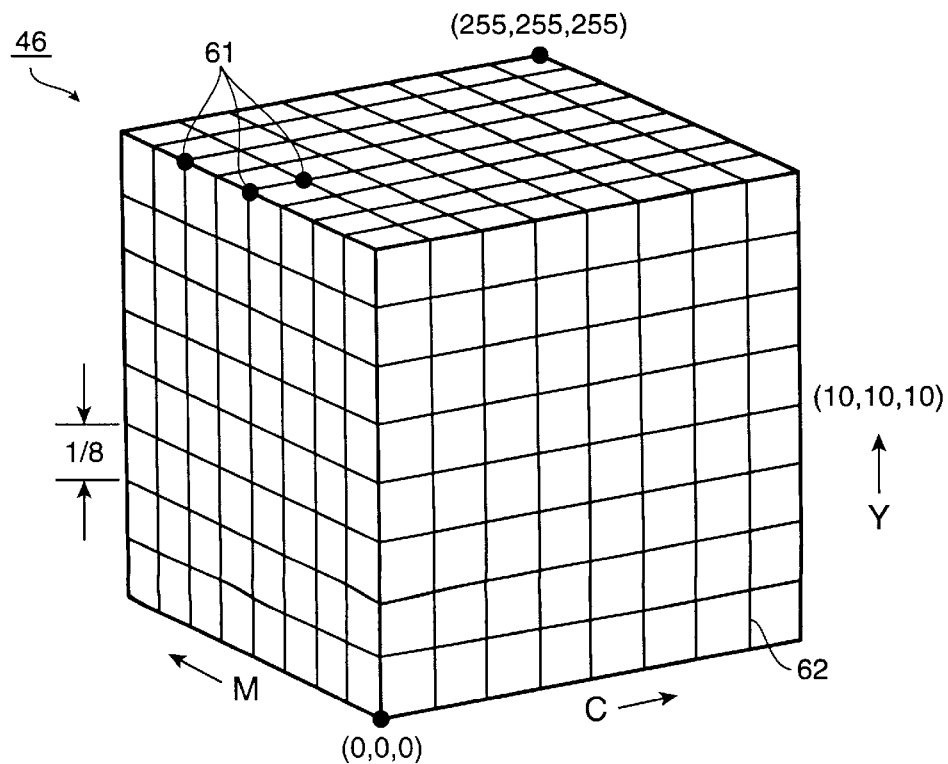

FIG. 3B is a diagrammatic illustration of a regularized printer LUT 46 according to the invention. As shown in FIG. 3B, printer LUT 46 is similar to that of LUT 45, except that printer LUT 46 is at a closer interval. Thus, LUT 46 includes grid points such as grid points 61 arranged on a regular lattice 62 with a fixed interval that is smaller than that of LUT 45. Here, the interval is exactly half of that for LUT 45, making LUT 46 a close interval LUT. As a result, a 10×10×10 grid is formed for each of the cyan, magenta and yellow color primaries that define the device dependent color space of printer 20, and range from a minimum value for each of the color primaries to a maximum intensity value thereof. It is one object of the invention to populate the entries for each of the grid points in LUT 46 without necessarily obtaining an empirical measurement for each of such grid points.

LUTs 45 and 46 need not actually be stored on disk 15, or at least need not be stored in the matrix form shown in FIGS. 3A and 3B. Rather, it is only necessary that the entries for each grid point in the LUT be stored.

The specific grid intervals, and resulting grid density, for LUTs 45 and 46 are representative only. Thus, and still within the scope of the invention, it is possible to provide virtually any value for the wide grid interval of LUT 45, and for the close grid interval of LUT 46, although the grid interval for LUT 46 should be smaller than that of LUT 45. One common example is an 8×8×8 grid for LUT 45 and a 16×16×16 grid for LUT 46, which illustrate a preference that LUT 46 be dimensioned as a power of 2, and that LUT 46 be exactly twice as dense as LUT 45. However, it is not necessary for the grid intervals to be related by exactly a factor of two; rather, other factors such as three or four are possible. In addition, it is not necessary for the grid interval to be related by integral factors, rather it is only necessary that the intervals be related by integral fractions, making it possible for LUT 45 to be an 8×8×8 grid while LUT 46 is a 12×12×12 grid.

Moreover, since printer 20 is assumed to form color images through combinations of three color primary values (i.e., cyan, magenta and yellow), a three-dimensional look-up table resulted. If four color primary values are used instead (for example, (for example, cyan, magenta and yellow and black), a four-dimensional look-up table would result, although this is not strictly necessary in dependence on the nature of undercolor removal performed by printer 20. However many dimensions are provided for the look-up table, each entry in the table contains a device independent measurement of the color for a corresponding device dependent printout.

Figure 4:
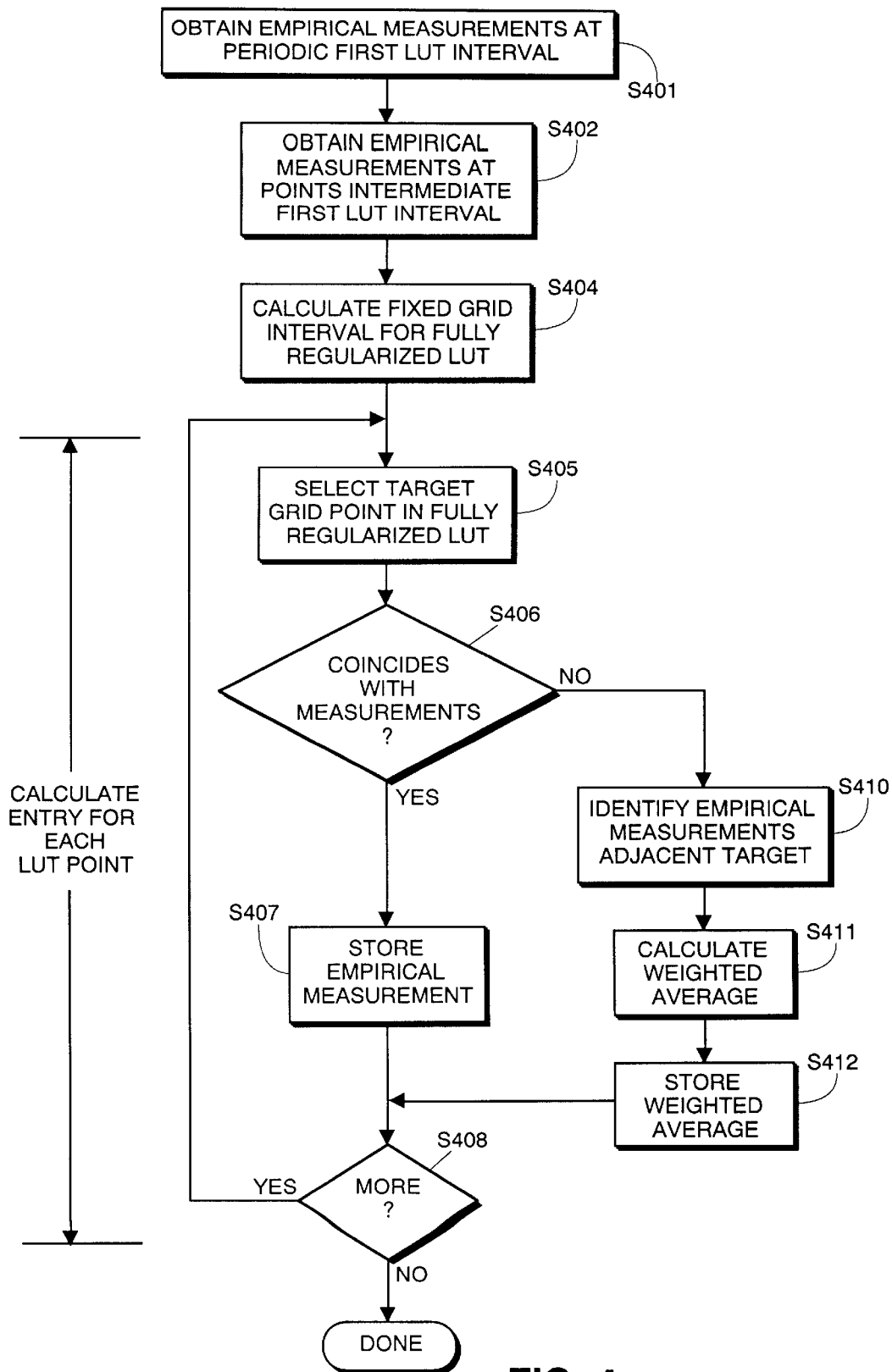
FIG. 4 is a flow diagram for explaining generation of a regularized printer LUT according to a first embodiment of the invention.

FIG. 4 is a flow diagram illustrating process steps for generating a regularized printer LUT according to the invention. The process steps shown in FIG. 4 are computer-executable process steps stored as code on a computer-readable medium, such as code 41 stored on disk 15. Briefly, according to FIG. 4, a color look-up table is generated by which color values in a first color space (such as a device dependent color space) are converted to color values in a second color space (such as a device independent color space), with the color look-up table being defined by regular grid points with a fixed grid interval therebetween. To generate the color look-up table, empirical measurements are first obtained in the second color space for a first set of plural color values in the first color space, with the first set of plural color values being substantially all color values at grid points on a first grid interval that is larger than the fixed grid interval. A second set of empirical measurements are also obtained, with the second set being plural color values at intermediate points between the grid points on the first grid interval. Thereafter, the fixed grid interval is selected, with the fixed grid interval being smaller than the first grid interval and being selected based on the relationship between the first grid intervals and where on the first grid interval the measured empirical values for the intermediate points are obtained. An entry is thereafter calculated for the color look-up table at each and every grid point defined by the fixed grid interval. In a case where a grid point corresponds exactly to a grid point for which an empirical measurement was obtained, the entry for such a grid point is equal to that empirical measurement. On the other hand, in a case where a grid point does not correspond to an empirical measurement, the entry for such grid point is equal to a calculated value based on empirical measurements of such grid point. One such method for obtaining a calculated value is through a weighted average of empirical measurements.

In more detail, step S401 obtains empirical measurements in a device independent color space such as L*a*b* of plural printed values in a device dependent color space such as CMY or CMYK. Such empirical measurements can be obtained through execution of code 40, so as to cause printer 20 to print samples of color patches with those samples thereafter being scanned by scanner 25 so as to obtain empirical measurements in a device independent color space. Preferably, the empirical measurements obtained in step S401 encompass substantially all color values at grid points for a coarse look-up table like LUT 45 with a wide grid interval. Not all colors need be measured, and in particular colors at color regions having only slowly varying color characteristics may be measured more sporadically than other regions.

In step S402, extra empirical measurements are obtained, at intermediate positions between the first grid interval. In particular, extra empirical measurements are obtained in critical regions where color characteristics change rapidly or non-linearly in response to only small changes in device dependent colors. The particular colors that are measured in step S402 are determined on a case-by-case basis in conjunction with color characteristics of the specific printer 20 under consideration. The color regions where such extra measurements are taken are hereinafter referred to as "critical regions" and, as previously mentioned, might relate to color regions that are non-linear or change rapidly in response to only small changes in device dependent coordinates. Other reasons exist for selecting such critical regions, and critical regions may be selected simply because the colors in that region are difficult to reproduce accurately (such as flesh tones) or because colors in that region are more important than other colors (such as colors related to corporate logos). More than one critical region may exist, with extra empirical measurements being made in each of the critical regions.

Figure 5A:
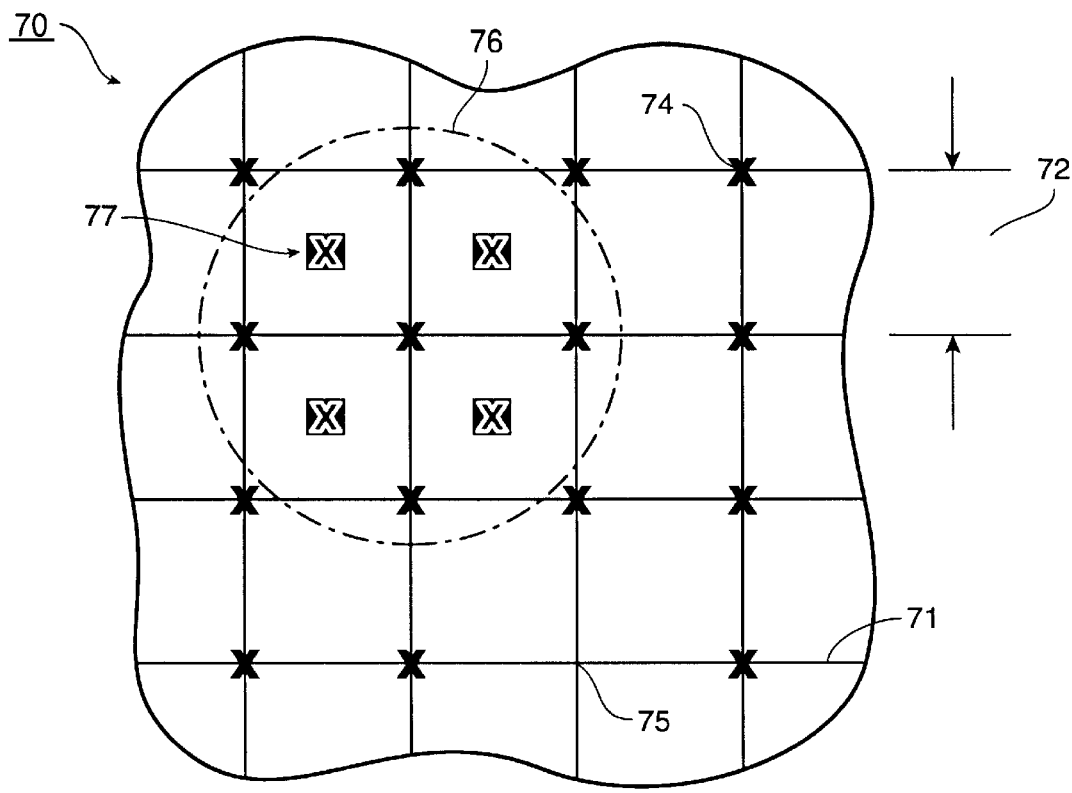
FIGS. 5A and 5B diagrammatically illustrate portions of printer LUTs having wide and close intervals, respectively, according to the first embodiment of the invention.

FIG. 5A is a diagrammatic illustration of empirical measurements taken as a result of steps S401 and S402. FIG. 5A shows a two-dimensional portion 70 of a grid 71 having a first grid interval 72 therebetween. As shown in FIG. 5A, empirical measurements 74 have been made at substantially all grid points, although a measurement at grid point 75 has not been taken in correspondence to an area where accurate color modeling is relatively straight forward. On the other hand, in a critical region such as region 76, additional empirical measurements have been made such as those shown at 77.

Reverting to FIG. 4, step S404 calculates a fixed grid interval for a regularized printer LUT. The fixed grid interval is selected based on interval 72 at which measurements were taken in step S401, and based also on the position of the intermediate points for measurements taken at step S402. Preferably, the fixed grid interval is selected so as to encompass all of the measured points, whether they were measured as part of a regularized grid or as part of intermediate points in critical regions. Thus, for example, when the additional empirical measurements are made at intermediate points between the first grid interval 72, if those intermediate measurements were positioned exactly halfway between grid points, the fixed grid interval for the regularized LUT is selected as exactly half of interval 72. It is not, however, strictly necessary for the fixed grid interval selected in step S404 to encompass all of the empirically measured values; rather, it is possible for the selected fixed grid interval to encompass only borders of the LUT. Selecting the fixed grid interval so that it does not encompass most of the measured points, however, results in a less desirable situation in that the resulting regularized LUT will contain more interpolated values than if the selection for the interval were made so as to encompass most of the measured values.

Flow thereafter proceeds to steps S405 through S412 so as to calculate an entry for each and every grid point defined by the fixed grid interval selected in step S404. Specifically, step S405 selects a target grid point in LUT 46, and step S406 tests whether the target grid point is coincident with a value measured empirically (either in step S401 of S402). If the target grid point is coincident with an empirically measured value, then flow advances to step S407 which stores the empirically measured value for entry at the target grid point in LUT 46. Thereafter, flow advances to step S408 which determines whether any remaining grid points in LUT 46 need calculations for an entry.

On the other hand, if step S406 determines that the target grid point in LUT 46 is not coincident with any empirically measured value, then flow branches to steps S410 through S412 which calculate a value for entry at such grid point in accordance with empirically measured values adjacent such grid point. Specifically, step S410 identifies points adjacent the target grid point that have empirically measured values, step S411 calculates a weighted average of such empirically measured values, and step S412 stores the weighted average as the entry at the target grid point.

Figure 5B:
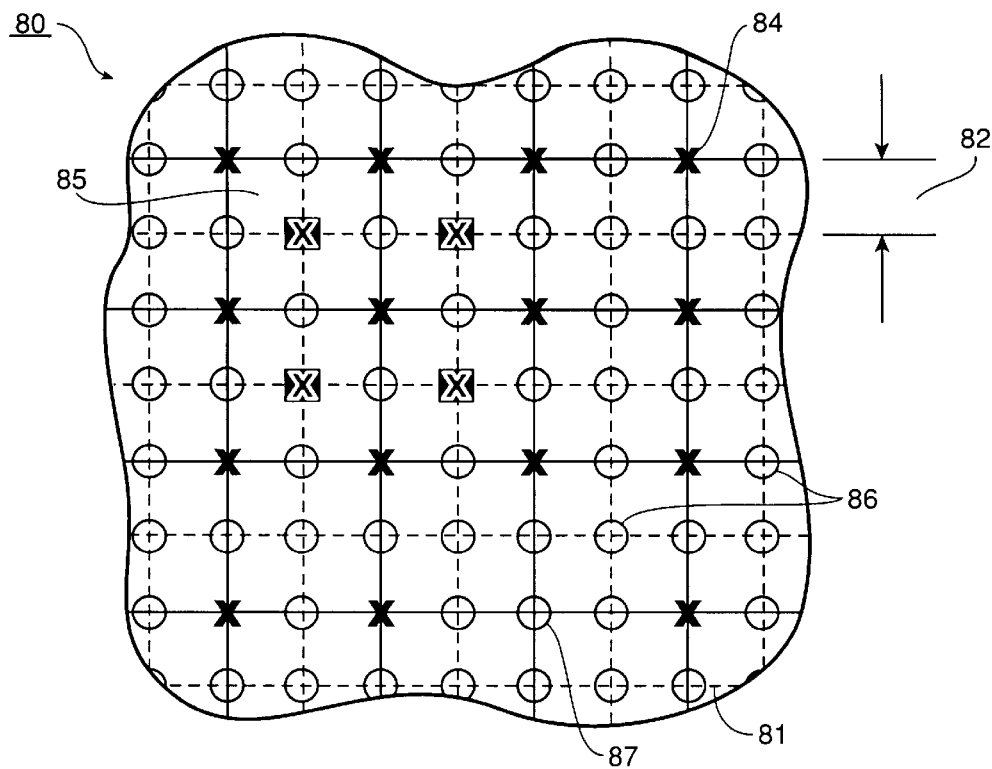

FIG. 5B illustrates a two-dimensional portion 80 of LUT 46 in connection with steps S405 through S412. As shown in FIG. 5B, a fixed grid interval 82 has been selected for lattice 81 of the LUT. For each grid point defined by the fixed grid interval for which an empirical measurement is available, the empirical measurement is stored as the entry for the LUT. Thus, at grid point 84, the empirically measured value obtained in step S401 (corresponding to point 74) is stored as the entry in the LUT. Likewise, at grid point 85, the empirically measured value obtained in step S402 (corresponding to 77) is stored as the entry in the LUT. On the other hand, for those grid points for which an empirically measured value was not obtained, then a value is calculated and stored as the entry in the grid. Thus, for grid points like 86, for which no empirically measured value is available, a value is calculated from adjacent empirically measured values, such as by weighted average. Likewise, for point 87, for which an empirically measured value was skipped because the point was not deemed particularly important, a value is calculated from adjacent measured values.

By virtue of the foregoing operation, a fully regularized printer LUT is obtained without necessarily entailing an empirical measurement for each and every grid point in the printer LUT.

A second embodiment of the invention will now be explained, in which empirical measurements of additional intermediate points between a wide interval LUT include additional measurements of "eccentric points". An eccentric point is a point that is between the wide grid interval of LUT 45, but which is located at a position that, to generate a fully regularized LUT that exactly encompassed the eccentric point, would require a fully regularized LUT of enormous size. For example, for non-eccentric points such as points 77 of FIG. 5A, which are located exactly half way between the coarse grid interval of LUT 45, a fully regularized LUT 46 can be generated whose size is only 8 (in the case of a three-dimensional LUT) or 16 (in the case of a four-dimensional LUT) times as large as LUT 45. Thus, the resulting size of fully regularized LUT 46 is practicable in terms of current computing equipment. That is, starting from a wide interval LUT 45 having an 8×8×8×8 grid structure of 4,096 grid points, a fully regularized LUT 46 can be obtained for some additional empirical measurements located exactly half way between such grid points, with the fully regularized LUT 46 being arranged as a 16×16×16×16 lattice with 65,536 entries. Although such a table is large, it is not so large that it cannot be handled easily by today's computing equipment.

On the other hand, as an example of an eccentric point, consider an 8×8×8×8 grid-arranged LUT 45 on a color space where each axis can take any of 256 intensity values such as 0 through 255. If an additional empirical measurement were obtained at a point located exactly one intensity level away from such a grid, that point would be considered an "eccentric point" since, because the point is located only one intensity level away (out of 256 intensity levels) the invention might possibly result in a fully regularized LUT having 256×256×256×256=4,294,967,296 entry points, or over 4 billion entries. Clearly, with today's computing equipment, a LUT having so many entries is simply not practicable.

Between these two extremes, what constitutes an eccentric point is subject to a flexible definition, having due regard for the capabilities of current computing equipment and practicable limitations on the size of resulting LUTs.

Generally speaking, in situations where an empirical measurement has been taken which includes eccentric points, the fixed grid interval for the resulting fully regularized LUT is selected such that it does not ordinarily encompass such eccentric points exactly. Recognizing, however, that measurements of such eccentric points correspond to color measurements in critical regions for which accurate color reproduction is sought, actually measured entries in the fully regularized LUT are modified so as to compensate for the values of the eccentric points. Specifically, in its ultimate use, the entries in the look-up table are subjected to color interpolation (such as tetrahedral or trilinear color interpolation) so as to obtain device independent color values for device dependent color values that are not found identically on grid points of the LUT. Accordingly, armed with knowledge of the particular interpolation technique with which the look-up table will be used, it is possible to adjust entries in the LUT so that, with interpolation, the exact empirical value measured for the eccentric point will be obtained even though the empirical value is not actually stored anywhere in the LUT.

Figure 6A:
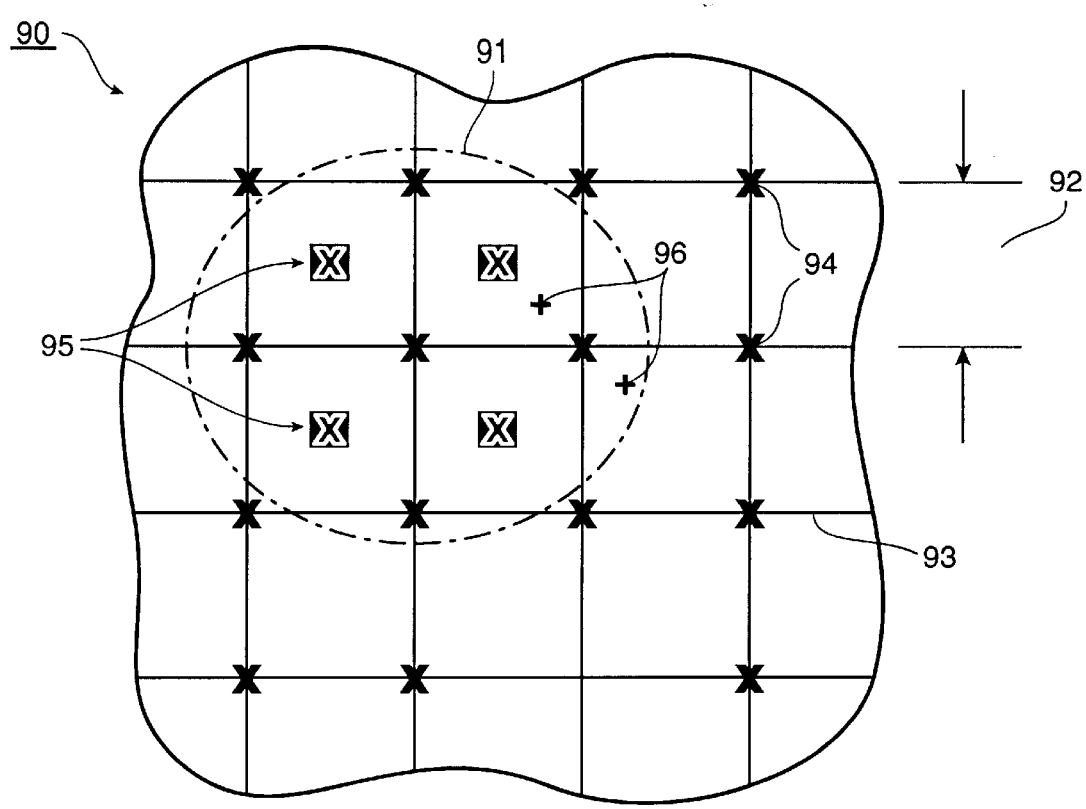
FIGS. 6A and 6B diagrammatically illustrate portions of printer LUTs having wide and close intervals, respectively, according to a second embodiment of the invention, which explains the influence of eccentric points.
Figure 6B:
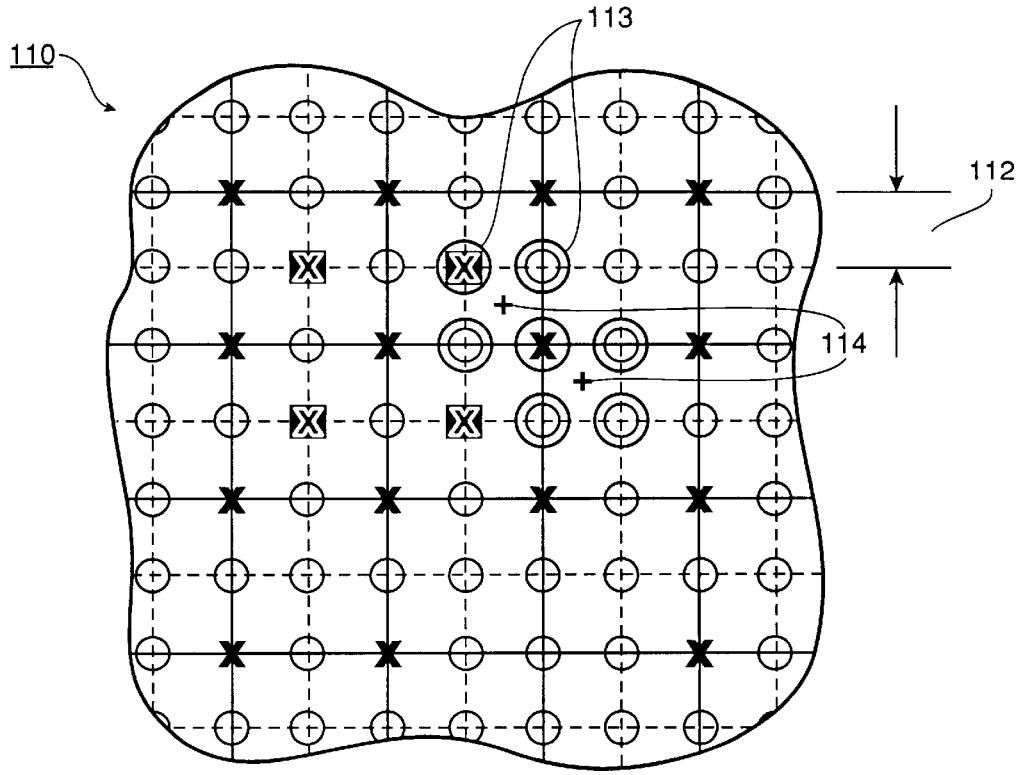

FIGS. 6A and 6B illustrate this situation more clearly. Specifically, FIG. 6A shows a two-dimensional portion 90 of look-up table 45 having a critical region 91 in which accurate color reproduction is desired. The look-up table is defined with a wide grid interval 92 on a lattice 93 and includes empirical measurements 94 of grid points on the lattice. In addition, empirical measurements are made for points 95 off the lattice, as explained previously with respect to the first embodiment.

In addition, eccentric points 96 are also measured. As can be appreciated, to fully regularize a LUT with close spacings because of eccentric points 96 would entail a regularized LUT of enormous size.

Accordingly, as shown in FIG. 6B, the fixed interval for a fully regularized LUT is selected so that it does not encompass the eccentric points 96. FIG. 6B shows a two-dimensional portion 110 of fully regularized LUT 46 having a fixed interval 112 selected that, although including additional measurements 95, does not include is eccentric points 96. As in the first embodiment, each and every grid point on the fully regularized LUT has an entry, with the entry either being calculated in a case where an empirical measurement is not available, or being the empirical measurement itself in a case where an empirical measurement is available. Entries at points adjacent the eccentric points, however, are modified based on the empirical measurements for the eccentric points. Specifically, entries for grid points 113 (whether such entries are calculated entries or actual empirical measurements) are modified based on the empirical measurements for eccentric points 114. The modifications are tailored such that the ultimate interpolation technique with which the look-up table is used will result in the exact empirically-measured value for eccentric points 114, even though such measured values are not actually stored anywhere in the look-up table.

Figure 7:
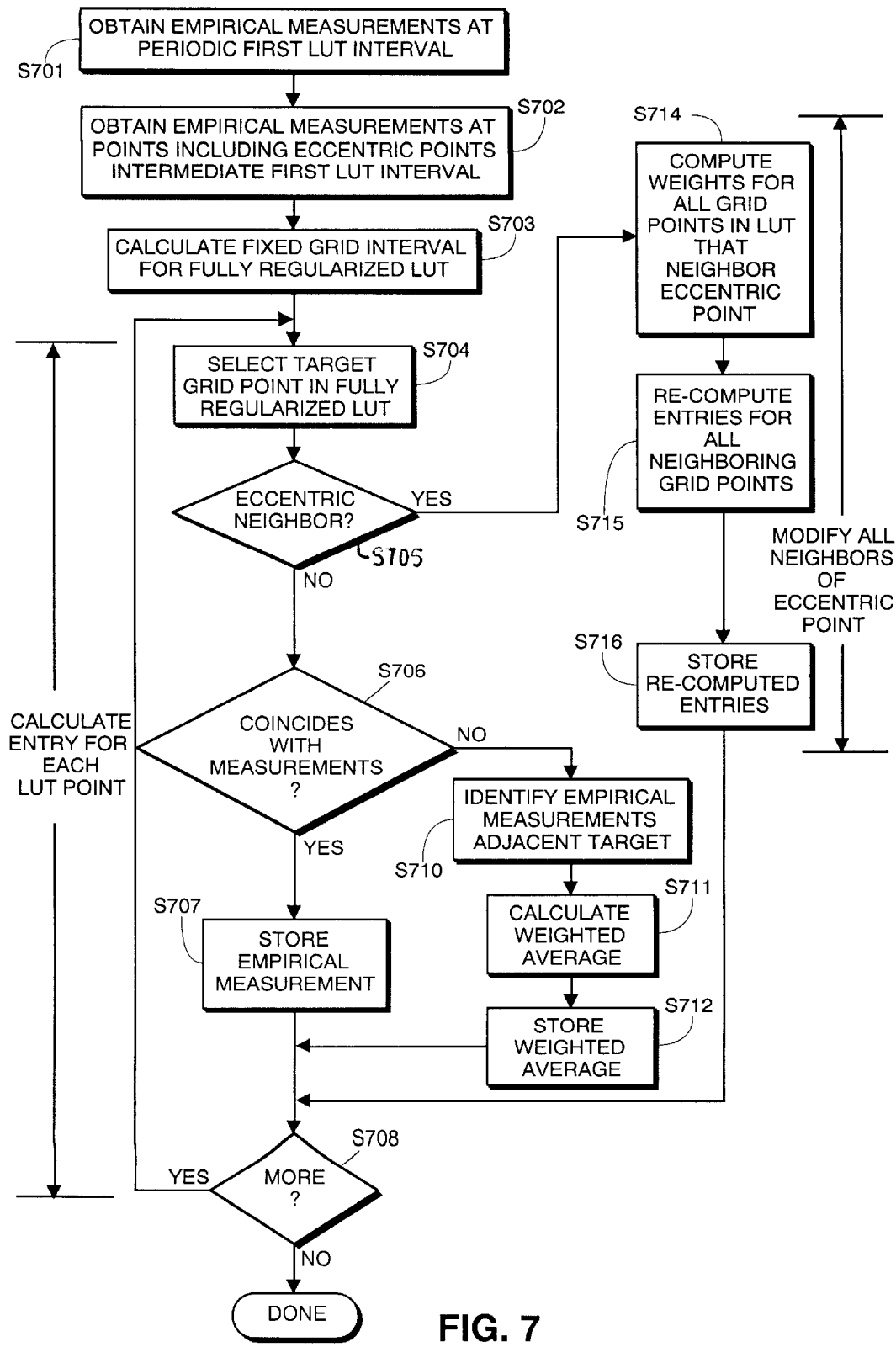
FIG. 7 is a flow diagram for explaining generation of a regularized printer LUT which compensates for the influence of eccentric points, according to the second embodiment of the invention.

FIG. 7 is a flow diagram illustrating operation of this embodiment of the invention. FIG. 7 illustrates process steps that are stored as computer-executable code on a computer executable medium, such as at code 41 on disk 15. Steps S701 and S702 are similar to steps S401 and S402, and obtain empirical measurements at a first grid interval together with empirical measurements at intermediate points between the first grid interval. However, in step S702, empirical measurements include empirical measurements of eccentric points.

Step S703 calculates a fixed grid interval for fully regularized LUT 45. The fixed grid interval is calculated so as to result in a closer spacing for the grid lattice than that of the grid interval in step S701, and is selected in dependence on the grid spacing in step S701 as well as the position of empirical measurements at step S702. However, the grid interval is selected specifically to exclude at least some of the eccentric points measured in step S702, so as to maintain a practicable size for the resulting fully regularized LUT.

Steps S705 through S716 calculate an entry for each and every grid point at the grid interval selected in step S704. Thus, steps S704 selects a target grid point in LUT 46. Step S705 determines whether the selected target grid point has an eccentric neighbor. Whether or not a particular target grid point has an eccentric neighbor depends on the interpolation technique with which the resulting fully regularized LUT is ultimately used. For a tetrahedral interpolation, for example, there will be four neighbors, whereas for trilinear interpolation there will be six neighbors.

If the target grid point does not have an eccentric neighbor, then flow advances to steps S706 through S712 which are more-or-less similar to corresponding steps S406 through S412. Thus, if the target grid point is coincident with an actual empirical measurement (step S706), then flow advances so as to store the empirical measurement as the entry for the grid point (step S707); whereas if the target pixel is not coincident with an empirical measurement, then flow branches so as to identify empirical measurements at points adjacent the target grid point (step S710), to calculate a weighted average of the adjacent points (step S711), and to store the calculated value as the entry in the LUT (step S712). Thereafter, flow returns to step S705 if step S708 determines that unprocessed target grid points remain in LUT 46.

On the other hand, should step S705 determine that the target grid point has eccentric neighbors, then flow branches to steps S714 through S716 so as to modify all neighbors of the eccentric point. Specifically, and as explained previously, entries at all grid points adjacent to the eccentric point (adjacent in the sense of the actual interpolation technique with which the fully regularized LUT will ultimately be used) are modified so that with interpolation of the neighbors, a resulting value of interpolation will yield the exact empirical measurement for the eccentric point even though such empirical measurement is not actually stored anywhere in the LUT.

Moreover, step S714 computes weights for the neighbors using the interpolation algorithm's distance metric. Those weights, and the entries at the neighboring points, are used to re-compute entries for all neighboring grid points. For example in a case where the entries are in device independent coordinates in L*a*b* space, the distance metric is measured as $\Delta L^*\Delta a^*\Delta b^*$. Weights based on these distances are calculated, and thereafter normalized so that the sum of the weights will be one. Then, for each of the neighbors, and for each of $\Delta L^*$, $\Delta a^*$ and $\Delta b^*$, normalized weights are applied so as to re-compute entries for all neighboring grid points. Thereafter, the re-computed entries are stored (step S716).

By virtue of the foregoing, it will be appreciated that a fully regularized LUT is generated, which properly compensates for empirical measurements of eccentric points, while at the same time maintaining a LUT whose size is practicable from the standpoint of today's computing equipment.

The invention has been described with respect to particular illustrative embodiments. It is to be understood that the invention is not limited to the above described embodiments and that various changes and modifications may be made by those of ordinary skill in the art without departing from the spirit and scope of the invention.

What is claimed is:

1. A method for generating a color look-up table by which color values in a first color space are converted to color values in a second color space, the color look-up table being defined by regular grid points with a fixed grid interval therebetween, comprising:

obtaining empirical measurements in the second color space for a first set of plural color values in the first color space, the first set of plural color values being substantially all color values at grid points on a first grid interval, wherein the first grid interval is larger than the fixed grid interval;

obtaining empirical measurements in the second color space of a second set of plural color values in the first color space, the second set of plural color values being color values at intermediate points between the grid points on the first grid interval;

selecting the fixed grid interval for the color look-up table, the fixed grid interval being smaller than the first grid interval and encompassing at least some of the grid points; and calculating an entry for the color look-up table at each and every grid point defined by the fixed grid interval, wherein in a case where a grid point corresponds to a grid point for which an empirical measurement was obtained in said first and second obtaining steps, the entry for such grid point is equal to such empirical measurement, and wherein in a case where a grid point does not correspond to an empirical measurement obtained in said first and second obtaining steps, the entry for such grid point is equal to a calculated value obtained from a weighted average of empirical measurements adjacent such grid point.

2. A method according to claim 1, wherein the fixed grid interval is a power of two.

3. A method according to claim 1, wherein the first set of plural color values corresponds to entry of a coarse LUT at the first grid interval, the second set of plural color values corresponds to grid points midway between grid points of said coarse LUTS, and wherein the fixed grid interval is half the first grid interval.

4. A method for generating a color look-up table by which color values in a first color space are converted to color values in a second color space, the color look-up table being defined by regular grid points with a fixed grid interval therebetween, comprising:

obtaining empirical measurements in the second color space for a first set of plural color values in the first color space, the first set of plural color values being substantially all color values at grid points on a first grid interval, wherein the first grid interval is larger than the fixed grid interval;

obtaining empirical measurements in the second color space of a second set of plural color values in the first color space, the second set of plural color values being color values at intermediate points between the grid points on the first grid interval and including an eccentric point;

selecting the fixed grid interval for the color look-up table, the fixed grid interval being smaller than the first grid interval and encompassing at least some of the grid points but excluding the eccentric points; and calculating an entry for the color look-up table at each and every grid point defined by the fixed grid interval, wherein in a case where a grid point does not correspond to an empirical measurement obtained in said first and second obtaining steps, the entry for such grid point is equal to a weighted average of empirical measurements adjacent such grid point, and wherein in a case where the grid point coincides with an empirical measurement obtained in said first and second obtaining steps, the entry for such grid point is equal to the empirical measurement unless an eccentric grid point is adjacent said grid point in which case the entry for such grid point is equal to a weighted average of empirical measurements adjacent said grid point including such eccentric point.

5. A method according to claim 4, wherein the fixed grid interval is a power of two.

6. A method according to claim 4, wherein the first set of plural color values corresponds to entry of a coarse LUT at the first grid interval, the second set of plural color values corresponds to grid points midway between grid points of said coarse LUTs, and wherein the fixed grid interval is half the first grid interval.

7. A method according to claim 4, wherein said first set of plural color values corresponds to entries of a coarse LUT at the first interval, wherein the second set of plural color values includes eccentric grid points not midway between grid points of the coarse LUT, and wherein the weighted average includes weights adjusted so that post-processing interpolation of entries at grid points adjacent the eccentric points yields the empirical measurement for the eccentric point.

8. An apparatus for generating a color look-up table by which color values in a first color space are converted to color values in a second color space, the color look-up table being defined by regular grid points with a fixed grid interval therebetween, comprising:

means for obtaining empirical measurements in the second color space for a first set of plural color values in the first color space, the first set of plural color values being substantially all color values at grid points on a first grid interval, wherein the first grid interval is larger than the fixed grid interval;

means for obtaining empirical measurements in the second color space of a second set of plural color values in the first color space, the second set of plural color values being color values at intermediate points between the grid points on the first grid interval;

means for selecting the fixed grid interval for the color look-up table, the fixed grid interval being smaller than the first grid interval and encompassing at least some of the grid points; and means for calculating an entry for the color look-up table at each and every grid point defined by the fixed grid interval, wherein in a case where a grid point corresponds to a grid point for which an empirical measurement was obtained in said first and second obtaining steps, the entry for such grid point is equal to such empirical measurement, and wherein in a case where a grid point does not correspond to an empirical measurement obtained in said first and second obtaining steps, the entry for such grid point is equal to a calculated value obtained from a weighted average of empirical measurements adjacent such grid point.

9. An apparatus according to claim 8, wherein the fixed grid interval is a power of two.

10. An apparatus according to claim 8, wherein the first set of plural color values corresponds to entry of a coarse LUT at the first grid interval, the second set of plural color values corresponds to grid points midway between grid points of said coarse LUTs, and wherein the fixed grid interval is half the first grid interval.

11. An apparatus for generating a color look-up table by which color values in a first color space are converted to color values in a second color space, the color look-up table being defined by regular grid points with a fixed grid interval therebetween, comprising:

means for obtaining empirical measurements in the second color space for a first set of plural color values in the first color space, the first set of plural color values being substantially all color values at grid points on a first grid interval, wherein the first grid interval is larger than the fixed grid interval;

means for obtaining empirical measurements in the second color space of a second set of plural color values in the first color space, the second set of plural color values being color values at intermediate points between the grid points on the first grid interval and including an eccentric point;

means for selecting the fixed grid interval for the color look-up table, the fixed grid interval being smaller than the first grid interval and encompassing at least some of the grid points but excluding the eccentric points; and means for calculating an entry for the color look-up table at each and every grid point defined by the fixed grid interval, wherein in a case where a grid point does not correspond to an empirical measurement obtained in said first and second obtaining steps, the entry for such grid point is equal to a weighted average of empirical measurements adjacent such grid point, and wherein in a case where the grid point coincides with an empirical measurement obtained in said first and second obtaining steps, the entry for such grid point is equal to the empirical measurement unless an eccentric grid point is adjacent said grid point in which case the entry for such grid point is equal to a weighted average of empirical measurements adjacent said grid point including such eccentric point.

12. An apparatus according to claim 11, wherein the fixed grid interval is a power of two.

13. An apparatus according to claim 11, wherein the first set of plural color values corresponds to entry of a coarse LUT at the first grid interval, the second set of plural color values corresponds to grid points midway between grid points of said coarse LUTs, and wherein the fixed grid interval is half the first grid interval.

14. An apparatus according to claim 11, wherein said first set of plural color values corresponds to entries of a coarse LUT at the first interval, wherein the second set of plural color values includes eccentric grid points not midway between grid points of the coarse LUT, and wherein the weighted average includes weights adjusted so that postprocessing interpolation of entries at grid points adjacent the eccentric points yields the empirical measurement for the eccentric point.

15. An apparatus for generating a color look-up table by which color values in a first color space are converted to color values in a second color space, the color look-up table being defined by regular grid points with a fixed grid interval therebetween, comprising:

a program memory for storing executable process; and a processor for executing the process steps stored in said program memory;

wherein the executable process steps stored in said program memory include process steps executable to (a) obtain empirical measurements in the second color space for a first set of plural color values in the first color space, the first set of plural color values being substantially all color values at grid points on a first grid interval, wherein the first grid interval is larger than the fixed grid interval, (b) obtain empirical measurements in the second color space of a second set of plural color values in the first color space, the second set of plural values being color values at intermediate points between the grid points on the first grid interval, (c) select fixed grid interval for the color look-up table, the fixed grid interval being smaller than the first grid interval and encompassing at least some of the grid points, and (d) calculate an entry for the color look-up table at each and every grid point defined by the fixed grid interval, wherein in a case where a grid point corresponds to a grid point for which an empirical measurement was obtained, the entry for such grid point is equal to such empirical measurement, and wherein in a case where a grid point does not correspond to an empirical measurement obtained, the entry for such grid point is equal to a calculated value obtained from a weighted average of empirical measurements adjacent such grid point.

16. An apparatus according to claim 15, wherein the fixed grid interval is a power of two.

17. An apparatus according to claim 15, wherein the first set of plural color values corresponds to entry of a coarse LUT at the first grid interval, the second set of plural color values corresponds to grid points midway between grid points of said coarse LUTs, and wherein the fixed grid interval is half the first grid interval.

18. An apparatus for generating a color look-up table by which color values in a first color space are converted to color values in a second color space, the color look-up table being defined by regular grid points with a fixed grid interval therebetween, comprising:

a program memory for storing executable process steps, and a processor for executing the process steps stored in said program memory;

wherein the executable process steps stored in said program memory include process steps executable to (a) obtain empirical measurements in the second color space for a first set of plural color values in the first color space, the first set of plural color values being substantially all color values at grid points on a first grid interval, wherein the first grid interval is larger than the fixed grid interval, (b) obtain empirical measurements in the second color space of a second set of plural color values in the first color space, the second set of plural color values being color values at intermediate points between the grid points on the first grid interval and including an eccentric point, (c) select the fixed grid interval for the color look-up table, the fixed grid interval being smaller than the first grid interval and encompassing at least some of the grid points but excluding the eccentric points, and (d) calculate an entry for the color look-up table at each and every grid point defined by the fixed grid interval, wherein in a case where a grid point does not correspond to an empirical measurement obtained, the entry for such grid point is equal to a weighted average of empirical measurements adjacent such grid point, and wherein in a case where the grid point coincides with an empirical measurement obtained, the entry for such grid point is equal to the empirical measurement unless an eccentric grid point is adjacent said grid point in which case the entry for such grid point is equal to a weighted average of empirical measurements adjacent said grid point including such eccentric point.

19. An apparatus according to claim 18, wherein the fixed grid interval is a power of two.

20. An apparatus according to claim 18, wherein the first set of plural color values corresponds to entry of a coarse LUT at the first grid interval, the second set of plural color values corresponds to grid points midway between grid points of said coarse LUTs, and wherein the fixed grid interval is half the first grid interval.

21. An apparatus according to claim 18, wherein said first set of plural color values corresponds to entries of a coarse LUT at the first interval, wherein the second set of plural color values includes eccentric grid points not midway between grid points of the coarse LUT, and wherein the weighted average includes weights adjusted so that post-processing interpolation of entries at grid points adjacent the eccentric points yields the empirical measurement for the eccentric point.

22. Computer-executable process steps stored on a computer readable medium, said computer-executable process steps for generating a color look-up table by which color values in a first color space are converted to color values in a second color space, the color look-up table being defined by regular grid points with a fixed grid interval therebetween, said computer-executable process steps comprising:

a step to obtain empirical measurements in the second color space for a first set of plural color values in the first color space, the first set of plural color values being substantially all color values at grid points on a first grid interval, wherein the first grid interval is larger than the fixed grid interval;

a step to obtain empirical measurements in the second color space of a second set of plural color values in the first color space, the second set of plural color values being color values at intermediate points between the grid points on the first grid interval;

a step to select the fixed grid interval for the color look-up table, the fixed grid interval being smaller than the first grid interval and encompassing at least some of the grid points; and a step to calculate an entry for the color look-up table at each and every grid point defined by the fixed grid interval, wherein in a case where a grid point corresponds to a grid point for which an empirical measurement was obtained, the entry for such grid point is equal to such empirical measurement, and wherein in a case where a grid point does not correspond to an empirical measurement obtained, the entry for such grid point is equal to a calculated value obtained from a weighted average of empirical measurements adjacent such grid point.

23. Computer-executable process steps according to claim 22, wherein the fixed grid interval is a power of two.

24. Computer-executable process steps according to claim 22, wherein the first set of plural color values corresponds to entry of a coarse LUT at the first grid interval, the second set of plural color values corresponds to grid points midway between grid points of said coarse LUTs, and wherein the fixed grid interval is half the first grid interval.

25. Computer-executable process steps stored on a computer readable medium, said computer-executable process steps for generating a color look-up table by which color values in a first color space are converted to color values in a second color space, the color look-up table being defined by regular grid points with a fixed grid interval therebetween, said computer-executable process steps comprising:

a step to obtain empirical measurements in the second color space for a first set of plural color values in the first color space, the first set of plural color values being substantially all color values at grid points on a first grid interval, wherein the first grid interval is larger than the fixed grid interval;

a step to obtain empirical measurements in the second color space of a second set of plural color values in the first color space, the second set of plural color values being color values at intermediate points between the grid points on the first grid interval and including an eccentric point;

a step to select the fixed grid interval for the color look-up table, the fixed grid interval being smaller than the first grid interval and encompassing at least some of the grid points but excluding the eccentric points; and a step to calculate an entry for the color look-up table at each and every grid point defined by the fixed grid interval, wherein in a case where a grid point does not correspond to an empirical measurement obtained, the entry for such grid point is equal to a weighted average of empirical measurements adjacent such grid point, and wherein in a case where the grid point coincides with an empirical measurement obtained, the entry for such grid point is equal to the empirical measurement unless an eccentric grid point is adjacent said grid point in which case the entry for such grid point is equal to a weighted average of empirical measurements adjacent said grid point including such eccentric point.

26. Computer-executable process steps according to claim 27, wherein the fixed grid interval is a power of two.

27. Computer-executable process steps according to claim 25, wherein the first set of plural color values corresponds to entry of a coarse LUT at the first grid interval, the second set of plural color values corresponds to grid points midway between grid points of said coarse LUTs, and wherein the fixed grid interval is half the first grid interval.

28. Computer-executable process steps according to claim 25, wherein said first set of plural color values corresponds to entries of a coarse LUT at the first interval, wherein the second set of plural color values includes eccentric grid points not midway between grid points of the coarse LUT, and wherein the weighted average includes weights adjusted so that post-processing interpolation of entries at grid points adjacent the eccentric points yields the empirical measurement for the eccentric point.

* * * * *

UNITED STATES PATENT AND TRADEMARK OFFICE
CERTIFICATE OF CORRECTION

PATENT NO. : 6,023,351

DATED : February 8, 2000

INVENTOR: T. NEWMAN

It is certified that error appears in the above-identified patent and that said Letters Patent is hereby corrected as shown below:

COLUMN 5

Line 2, "from" should be deleted.

COLUMN 9

Line 55, "is" should be deleted.

COLUMN 16

Line 51, "27," should read --25,--.

Signed and Sealed this

Twenty-seventh Day of March, 2001

Attest:

NICHOLAS P. GODICI

*Attesting Officer*    Acting Director of the United States Patent and Trademark Office